US008264725B1

(12) United States Patent
Pillutla et al.

(10) Patent No.: US 8,264,725 B1
(45) Date of Patent: Sep. 11, 2012

(54) PROVIDING PRINTABLE CONTENT

(75) Inventors: Supriya Pillutla, Karnataka (IN);
Kumaravel Ganesan, Dindigul
TamilNadu (IN); **Palanikumar
Thangapandian, Karnataka (IN); Jojee
Thomas Chackalackal**, Karnakata (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/222,336

(22) Filed: Aug. 31, 2011

Related U.S. Application Data

(63) Continuation-in-part of application No. 13/162,964, filed on Jun. 17, 2011.

(51) Int. Cl.
*G06F 15/00* (2006.01)
*G06F 3/12* (2006.01)
*G06K 1/00* (2006.01)
(52) U.S. Cl. ...................................... 358/1.15; 358/1.14
(58) Field of Classification Search .......................... None
See application file for complete search history.

(56) References Cited

U.S. PATENT DOCUMENTS

| 7,248,383 | B2 | 7/2007 | Yoshida et al. |
| 7,586,636 | B2 | 9/2009 | Karaoguz et al. |
| 7,623,256 | B2 | 11/2009 | Ciriza et al. |
| 2002/0065741 | A1 | 5/2002 | Baum |
| 2003/0076528 | A1 | 4/2003 | Parry et al. |
| 2007/0146772 | A1* | 6/2007 | Castellani ..................... 358/1.15 |
| 2009/0248632 | A1 | 10/2009 | Subramanian |
| 2010/0123922 | A1* | 5/2010 | Condello et al. ............. 358/1.15 |
| 2010/0188689 | A1 | 7/2010 | Gnanasambandam et al. |
| 2010/0302590 | A1 | 12/2010 | Matsubayashi et al. |
| 2010/0309508 | A1 | 12/2010 | Kamath et al. |
| 2011/0090529 | A1* | 4/2011 | Hertling ....................... 358/1.15 |
| 2011/0315755 | A1* | 12/2011 | Koakutsu ........................... 235/3 |

OTHER PUBLICATIONS

Ragnet, Francois: "Social Networking for Printers?"; Nov. 8, 2007.

* cited by examiner

*Primary Examiner* — Douglas Tran
(74) *Attorney, Agent, or Firm* — Garry A. Perry

(57) ABSTRACT

In one embodiment, a registry of network-connected printers that are members of a social print group is maintained at a computer system. Content is obtained. A first request is received from a first printer that is a member of the group. The first request is a request to share the content with a second printer that is a member of the group. A communication that the content is accessible at the second printer is sent. A second request is received from the second printer. The second request is a request to provide the content to the second printer. Content is provided to the second printer.

20 Claims, 4 Drawing Sheets

PROVIDING PRINTABLE CONTENT

CROSS REFERENCE TO RELATED APPLICATION

This application is a continuation-in-part of U.S. patent application Ser. No. 13/162,964, entitled "Sharing Content Among Printers," which was filed on Jun. 17, 2011, and is hereby incorporated by reference.

BACKGROUND

Certain internet-connected printers are capable of sending and receiving communications and printable content via the Internet without being connected to a desktop computer, laptop computer, or other host computing device. Such functionality can provide considerable flexibility and efficiencies for a user, as the user may have the ability to download and print content at familiar and unfamiliar printers without the complication of first establishing a connection with a host.

BRIEF DESCRIPTION OF THE DRAWINGS

The accompanying drawings illustrate various embodiments and are a part of the specification. The illustrated embodiments are examples and do not limit the scope of the claims. Throughout the drawings, identical reference numbers designate similar, but not necessarily identical elements.

The same part numbers designate the same or similar parts throughout the figures.

DETAILED DESCRIPTION OF EMBODIMENTS

Figure 1:
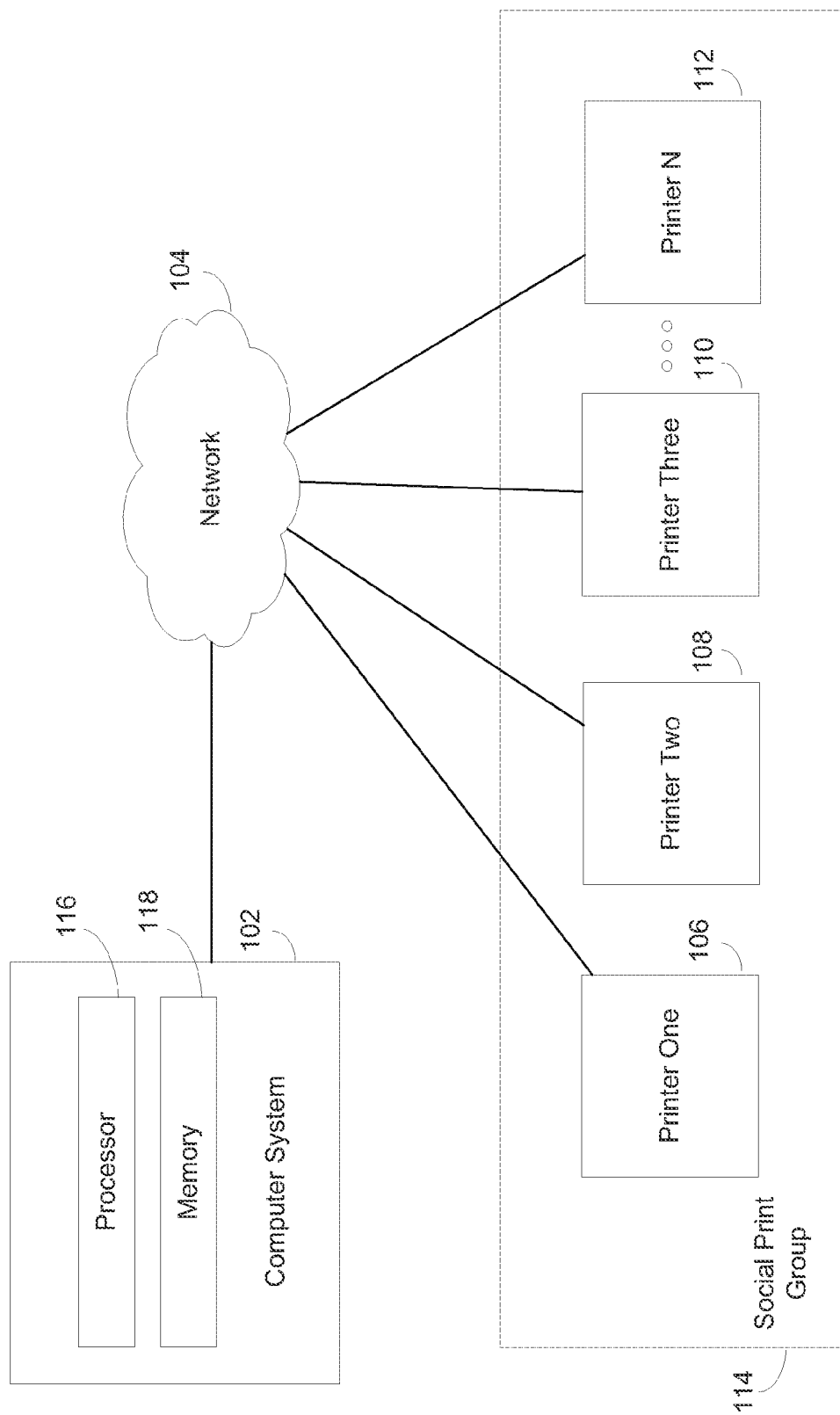
FIG. 1 is a block diagram illustrating a system according to various embodiments.

An advantage of an internet-connected printer is that content can be retrieved and printed at the printer without the printer being connected to a host computing device. A limitation to this advantage has been the ability for a user of such a printer to obtain content from users of other printers in a trouble-free and efficient manner. For example, a user of a first internet-connected printer may obtain printable content from a second network-connected printer via an exchange of emails between the printers, including an email sent to the first printer from the second printer with the content as an attachment. However, using email in this manner to obtain content can be unwieldy in some use cases due to the length of the email addresses (e.g., when the addresses are supplied by a user), frequency of changes to email addresses (e.g., user changes or changes coinciding with a changed IP address), and/or the number of printers from which the first printer will obtain content. Other file sharing protocols that necessitate a user of a first printer repeatedly provide an IP address or other identifier to obtain content from other printers have similar limitations.

Accordingly, various embodiments described herein were developed in an effort to facilitate the provision of printable content to an internet-connected printer that is a member of a social print group. The content is content that has been made accessible to the first printer at the request of other members of the group. It should be noted that while the disclosure is discussed frequently with reference to internet-connected printers, the teachings of the present disclosure are not so limited and can be applied to any network-connected printer. According to embodiments described herein, a registry of network-connected printers that are members of a social print group maintained at a computer system. The computer system obtains printable content. A request is received at the computer system from a first printer that is a member of the social print group, the request to share the content with a second printer that is also member of the group. The computer system sends a communication that the content is accessible at the second printer. The computer system receives from the second printer a request to provide the content to the second printer. In response to the provision request, the computer system provides the content to the second printer.

As used herein, a "network-connected printer" refers to a printer that can be connected to a network, to be capable of obtaining content, sending and receiving messages, accessing network content, and/or accessing applications via a network. In examples, the network may be a proprietary network, a secured network, an open network, an intranet, an extranet, an internet or the Internet. A "social print group" refers to a group, community or collection of printers connected via a network. The printers may be grouped by virtue of an interdependency or commonality between the printers, including but not limited to receipt of an invitation to join the group, or friendship, kinship, location, common interests, financial exchanges, and/or educational exchanges as between users of the printers. "Sharing" content refers to providing, providing access to, or distributing content, "Content" refers to any text, image, or other content that can be displayed and/or printed. "Printer-captured content" refers to content that is in digital form by virtue of a scanning or image capture operation performed at a printer. "Printer" or "printing device" refers to any electronic device that prints and includes multifunctional electronic devices that perform additional functions such as scanning and/or copying.

FIG. 1 is a block diagram illustrating a system according to various embodiments. FIG. 1 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

FIG. 1 shows printer one 106, printer two 108, printer three 110, printer N 112, and computer system 102 connected to a network 104. Printers one 106, two 108, three 110, and N 112 represent generally computing devices that are operable to produce printed output and to send and receive communications and content to each other over the network 104. Computer system 102 represents generally any computing device or group of computing devices capable of sending network requests and content to, and otherwise communicating with, printers one 106, two 108, three 110, and N 112. In embodiments, computer system 102 may be or include a server, desktop computer, laptop computer, mobile computing device, tablet computer, and/or any other computing device.

In an embodiment, computer system 102 creates a social print group 114 and maintains a registry of network-connected printers one 106, two 108, three 110, and N 112 that are members of the group. In embodiments, the registry may be in the form of a schedule, file, catalog, database, record, inventory, listing, directory or list. Computer system 102 may send invitations to network-connected printers to be members of the social print group 114. In an example, the invitations may be sent to the prospective member printers based on data suggesting one or more types of interdependency or commonality between users of the member printers and users of the prospective printers, such as, but not limited to, friendship, kinship, location, common interests, financial exchanges, and educational exchanges.

Computer system 102 obtains content that shareable among network-connected printers one 106, two 108, three 110, N 112 and other network-connected printers that are members of the social print group 114. In examples, the computer system 102 may obtain the content at the direction of one of the network-connected printers, or may obtain the content by other means. For example, the content may be printer-captured content that is received at server 102 via the network 104 from any of printers one 106, two 108, three 110, or N 112. In another example, the content received at computer system 102 may be content received from a remote repository, e.g., a web page hosted by a web server computing device accessible to computer system 102 via the network. The content may be obtained via a networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP"), and/or Session Initiation Protocol ("SIP").

Computer system 102 receives from network-connected printer one 106, via network 104, a request to share the content with a network-connected printer two 108. Printer one 106 and printer two 108 are members of the same social print group 114. In an example, the request may originate from a web browser at printer one 106. In another example, the request that is received at computer system 102 may be received via a software application that is executed at printer one 106, or at another computing device in communication with printer one 106. In yet another example, the request that is received at computer system 102 may be received via a web application that is accessible to a user at printer one 106, but which actually is executed at a web server that is remote to printer one 106 and accessible to printer one 106 via the network 104.

In response to receipt of the request to share content, computer system 102 sends to printer two 108 a communication that the content is accessible at printer two 108. The communication may be sent via a networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP"), and/or Session Initiation Protocol ("SIP"). In an example, system 102 may send the communication directly to printer two 108 via the network 104. In another example, computer system 102 may post the communication at a web site that is accessible to printer two 108 via the network 104 such that printer two 108 can obtain the communication from the web site. In another example, the communication that the content is accessible at printer two 108 is sent to a computing device distinct from printer two 108.

Computer system 102 receives from printer two 108 a request to provide the content to the second printer. In embodiments, the request to provide content may be received via a networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP"), and/or Session Initiation Protocol ("SIP"). In an example, system 102 may receive the request directly from printer two 108 via the network 104. In another example, printer two 108 may post the request at a web site that is accessible to computer system 102 via the network 104 such that computer system 102 can obtain the request from the web site. In an embodiment, the communication may in the form of an email. In an example the request may be received from a user, the request sent via a user interface at printer two 108. In another example, the request is automatically sent by printer two 108 in response to receipt of the communication from the computer system that content is available at printer two 108.

In response to receipt of printer two's request to provide content, computer system 102 provides the content to printer two 108. The content may be provided via a networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP"), and/or Session Initiation Protocol ("SIP"). In an example, system 102 may send the content directly to printer two 108 via the network 104. In another example, computer system 102 may post the content at a web site that is accessible to printer two 108 via the network 104 such that printer two 108 can obtain the content from the web site.

The functions and operations described with respect to computer system 102 may be implemented as a computer-readable storage medium containing instructions executed by a processor (e.g., processor 116) and stored in a memory (e.g., memory 118). In a given implementation, processor 116 may represent multiple processors, and memory 118 may represent multiple memories. Processor 116 represents generally any instruction execution system, such as a computer/processor based system or an ASIC (Application Specific Integrated Circuit), a computer, or other system that can fetch or obtain instructions or logic stored in memory 118 and execute the instructions or logic contained therein. Memory 118 represents generally any memory configured to store program instructions and other data.

Figure 2:
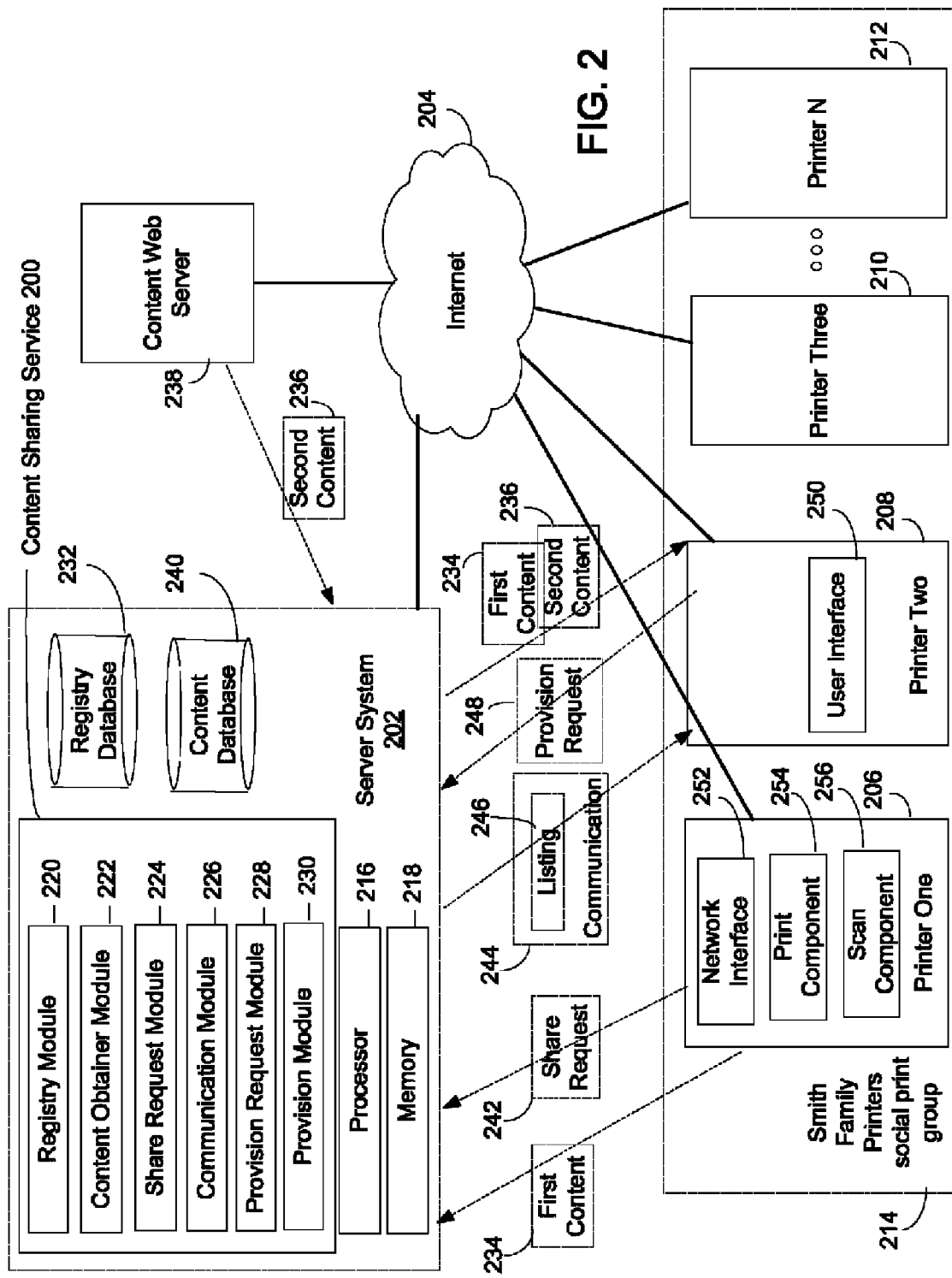
FIG. 2 is a block diagram illustrating a system according to various embodiments.

FIG. 2 is a block diagram that includes a server system according to various embodiments. FIG. 2 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

As illustrated in FIG. 2, server system 202 may be a single physical device or it may be distributed among multiple physical devices connected over a network (e.g., the Internet). For example, server system 202 may represent a cloud computing infrastructure (i.e., the cloud). In a cloud computing infrastructure, various components/modules of server system 202 may share resources and/or act in concert even though they might be in different physical locations and/or operating on different physical devices.

FIG. 2 shows printer one 206, printer two 208, printer three 210, printer N 212, and server system 202 connected to internet 204. Server system 202 includes a content sharing service 200 that includes a registry module 220, content obtainer module 222, share request module 224, communication module 226, provision request module 228, and provision module 230.

Registry module 220 maintains a registry database 232 of internet-connected printers, including printers one 206, two 208, three 210, and N 212 that are members of a "Smith Family Printers" social group 214. In this example, the Smith Family Printers social group 214 is a collection of printers whose member printers are owned or used by members of a Smith family. Server system 212 may send an invitation to an internet-connected printer to be a member of the Smith Family Printers social print group 214 based kinship, friendship, location, and/or other dependencies between users of the printers. In an example, registry module 220 may receive a request to add an internet-connected printers to the Smith Family Printers social print group 214, and in response such a request designate a printer as a member of the group at the registry database 232. In an embodiment, registry module 220 may send to printer one 206 programming to provide access for printer one 206 to the registry database 232. In yet another example, registry module 220 may send to printer one 206 programming to enable printer one 206 to view a listing or graphic of members of the social print network 214, and to send a request to server system 202 to share content with the other printers.

Content obtainer module 222 obtains content that can be provided to internet-connected printers one 206, two 208, three 210, N 212 and other internet-connected printers that are members of the social print group 214. In an example, the server system 202 may obtain first content 234, via the internet 204, from printer one 206 as printer-captured content (e.g., digital content that was created by scanning or image capture at printer one 206). In another example, the obtained content may be printer-captured content that is received at server system server 202 via the internet 204 from any of printers two 208, three 210, or N 212. In another example, server system 202 may receive second content 236 via the internet 204 from content web server 238, at the direction of printer one 206. An example of a web server that server system 202 might receive second content 236 from is an internet-accessible photo service such as the Snapfish® web service provided by Hewlett Packard Company of Palo Alto, Calif. In an example, content obtainer module 222 causes the first 234 and second 236 content to be stored within server system 202 at a content database 240. In yet another example, content obtainer module 222 may cause conversion of the content into a page description language format prior to storage at the content database 240.

Share request module 224 receives from internet-connected printer one 206, via internet 204, a request 242 to share with internet-connected printer two 208 the content that was obtained by content obtainer module 222. Printer one 206 and printer two 208 are members of the same social print group 214. In an example, the request 242 is sent to server system 202 by printer one 206 via an internet application accessed at printer one 206. In another example, the request 242 to share the obtained content is received from printer one 206 via a software application that is executed at printer one. In the example of FIG. 2, the obtained content includes first content 234 that is printer-captured content obtained from printer one 206, and second content 236 that is obtained via the internet 204 from content web server 238 at the direction of printer one 206. In other examples, the obtained content may be one of first content 234 or second content 236, or may include other obtained content.

In response to receipt at the share request module 224 of the request 242 to share first content 234 and second content 236, communication module 226 sends to printer two 208 a communication 244 that the first 234 and second 236 content is accessible at printer two 208. In an embodiment, the communication 244 may include a listing 246 or other description of printable content including the first content 234, second content 236 and other printable content. In an example, server system 202 may send the communication 244 directly to printer two 208 via the internet 204. In an example, the communication 244 that is sent is viewable by a user at printer two 208 via a user interface 250 at printer two 208. In an example, the communication 244 is viewable by the user via an application executing at the second printer 208. In another example, the communication 244 is viewable by the user via an internet application executing at a computing device distinct from the second printer 208, which internet application is viewable by and can by interacted with by a user via a user interface 250 at printer 208. In another example, server system 202 may post the communication 244 at a web site that is accessible to printer two 208 via the internet 204 such that printer two 208 can obtain the communication 244 from the web site.

Provision request module 228 receives from printer two 208 a request 248 to provide the content to the second printer. In an example, server system 202 may receive the provision request 248 directly from printer two 208 via the internet 204. In another example, printer two 208 may post the provision request 248 at a web site that is accessible to server 202 via the internet 204 such that the server system 202 can obtain the request 248 from the web site. In an example, the provision request 248 may be received from a user, the request 248 sent via a user interface 250 at printer two 208. In another example, the request 248 is automatically sent by printer two 208 in response to receipt of the communication 244 that first content 234 and second content 236 is available at printer two 208. In an example, the provision request 248 is received at server system 202 via an application executed at printer two 208. In another example, the provision request 248 is received at server system 202 via an internet application that executes at a computing device distinct from the printer two 208, which application is visible to and can be interacted with by a user via a user interface 250 at printer two 208.

Provision module 230, in response to the provision request module's receipt of the request 248 to provide content, provides the obtained content to printer two 208. In an example, provision module 230 sends printer two 208 the content via internet 204. In an example, provision module 230 provides the content to printer two 208 in a page description language format. For example, provision module 230 may perform raster image processing of the content or otherwise convert the content into a page description format prior to sending to printer two 208. In yet another example, provision module 230 may cause the processing that converts the content into page description language format to occur at a computer system distinct from server system 202.

In an example the provision module 230 sends printer two 208 programming configured to enable printer two 208 to access the content via internet 204. In an example, the programming that is sent to printer two 208 is a user interface to provide a user of printer two 208 with a view of and access to the first 234 and second 236 content at server system 202. In another example, the programming that is sent to printer two 208 is a user interface to allow a user of printer two 208 to view and access the first 234 and second 236 content via a web service application that executes at a computing device separate from server system 202. Returning to the Snapfish® web service as an example of a content web server 238, a user interface may be sent to printer two 208 that is a graphic user interface icon to appear on a control panel of printer two 208. When touched by a user of printer two 208, the icon provides the user with an ability to view and access, via server system 202, photo content stored at the Snapfish® web server that was posted by printer one 206 for access by other internet-connected printers that are members of the Smith Family Printers social print group 214.

In another example, the programming that is sent to printer two 208 is a software application configured to be executed at printer two 208 and thus enable the accessing of the content by printer two 208. In another example, the programming that is sent by provision module 230 to printer two 208 is a Uniform Resource Locator ("URL") or other address that specifies where the content is available and/or a mechanism for retrieving the content. In another example, server system 202 may provide the obtained content to printer two 208 by posting the content at a web site accessible to the printer two 208. In yet another example, server system 202 may send the obtained content itself to printer two 208 via the internet 204.

Printer one 206 is shown to include a network interface 252, print component 254, and a scan component 256. Network interface 252 represents generally any combination of hardware and programming configured for electronically connecting printer one 206 to internet 204. Print component 254 represents generally any combination of hardware and programming configured to produce printed output. Scan component 256 represents generally any combination of hardware and programming configured to perform a scanning or image capture operation at printer one 206 so as to create printer-captured content in a digital form that can be shared with the other printers in the social print group 214 via the content sharing service 200 of server system 202. Printers two 208, three 210, and N 212 may be configured similarly to printer one 206.

The functions and operations described with respect to server system 202 may be implemented as a computer-readable storage medium containing instructions executed by a processor (e.g., processor 216) and stored in a memory (e.g., memory 218).

Figure 3:
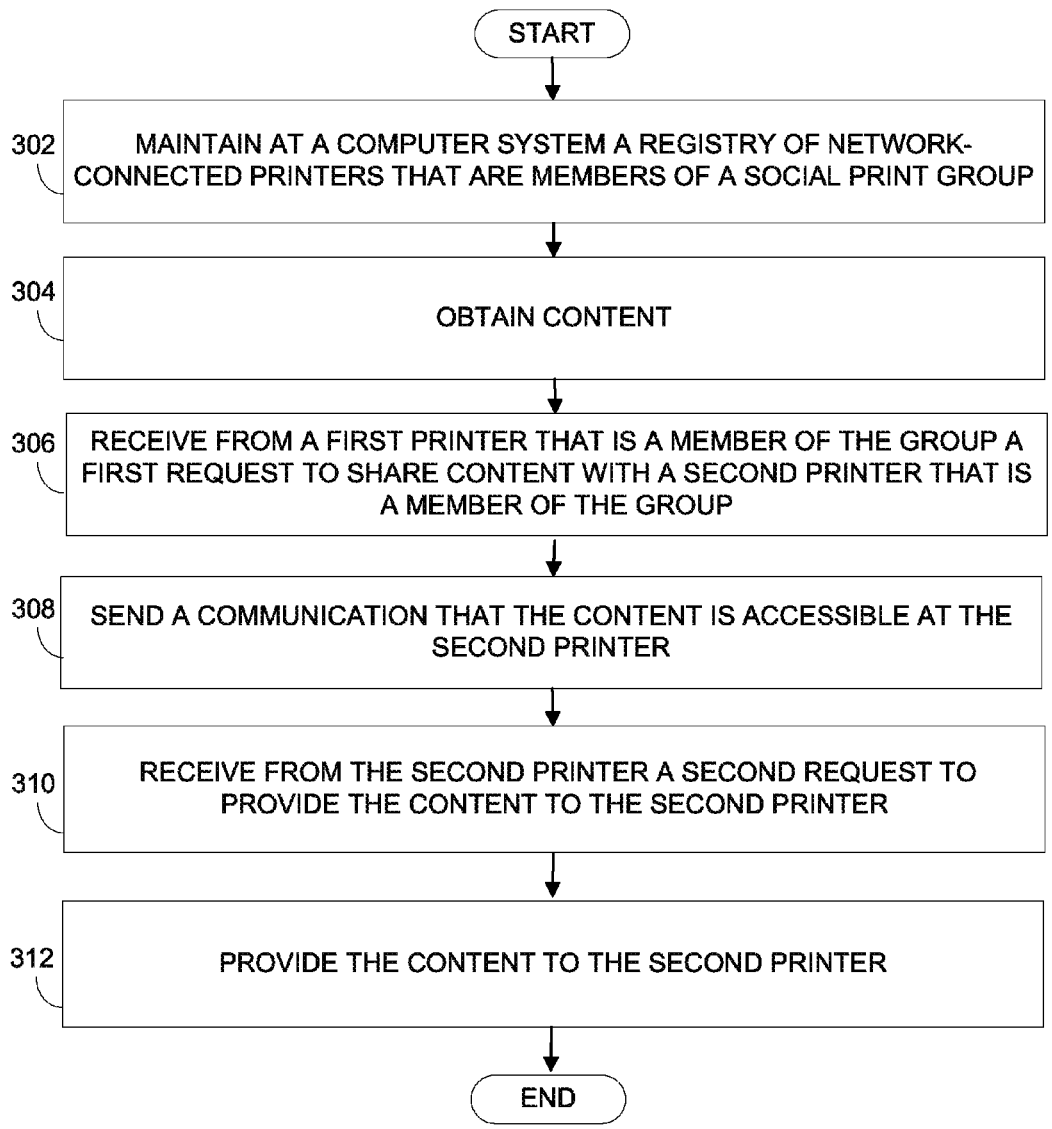
FIG. 3 is a flow diagram depicting steps taken to implement various embodiments.
Figure 4:
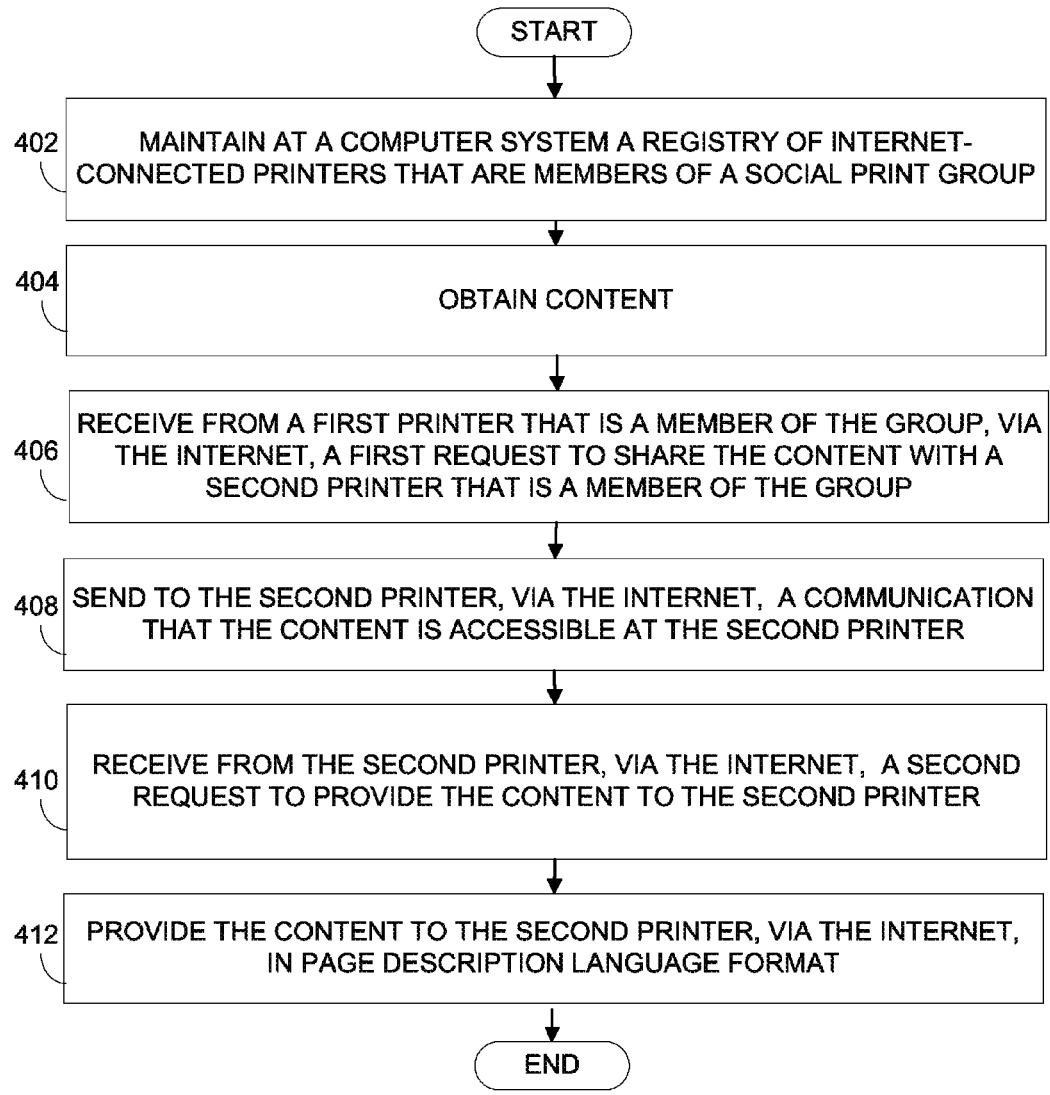
FIG. 4 is a flow diagram depicting steps taken to implement various embodiments.

FIGS. 3 and 4 are flow diagrams of operation in a system according to various embodiments. In discussing FIGS. 3 and 4, reference may be made to the diagram of FIG. 2 to provide contextual examples. Implementation, however, is not limited to those examples. Starting with FIG. 3, a computer system maintains a registry of network-connected printers that are members of a social print group. (block 302). Referring back to FIG. 2, the registry module 220 may be responsible for implementing block 302.

Continuing with the flow diagram of FIG. 3, the computer system obtains content (block 304). Referring back to FIG. 2, the content obtainer module 222 may be responsible for implementing block 304.

Continuing with the flow diagram of FIG. 3, the computer system receives a first request from a first printer that is a member of the social print group. The first request is a request to share content with a second printer that is a member of the group (block 306). Referring back to FIG. 2, the share request module 224 may be responsible for implementing block 306.

Continuing with the flow diagram of FIG. 3, the computer system sends a communication that the content is accessible at the second printer (block 308). Referring back to FIG. 2, the communication module 226 may be responsible for implementing block 308.

Continuing with the flow diagram of FIG. 3, the computer system receives from the second printer a second request to provide the content to the second printer (block 310). Referring back to FIG. 2, the provision request module 228 may be responsible for implementing block 310.

Continuing with the flow diagram of FIG. 3, responsive to the second request the computer system provides the content to the second printer (block 312). Referring back to FIG. 2, the provision module 230 may be responsible for implementing block 312.

Moving to FIG. 4, a computer system maintains a registry of internet-connected printers that are members of a social print group. (block 402). Referring back to FIG. 2, the registry module 220 may be responsible for implementing block 402.

Continuing with the flow diagram of FIG. 4, the computer system obtains content (block 404). Referring back to FIG. 2, the content obtainer module 222 may be responsible for implementing block 404.

Continuing with the flow diagram of FIG. 4, the computer system receives a first request, via the internet, from a first printer that is a member of the social print group. The request is a request to share content with a second printer that is a member of the group (block 406). Referring back to FIG. 2, the share request module 224 may be responsible for implementing block 406.

Continuing with the flow diagram of FIG. 4, the computer system sends to the second printer, via the internet, a communication that the content is accessible at the second printer (block 408). Referring back to FIG. 2, the communication module 226 may be responsible for implementing block 408.

Continuing with the flow diagram of FIG. 4, the computer system receives from the second printer, via the internet, a second request to provide the content to the second printer (block 410). Referring back to FIG. 2, the provision request module 228 may be responsible for implementing block 410.

Continuing with the flow diagram of FIG. 4, responsive to the second request, the computer system provides the content to the second printer, via the internet, in a page description language format (block 412). Referring back to FIG. 2, the provision module 230 may be responsible for implementing block 412.

Although the flow diagrams of FIGS. 3 and 4 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

Various modifications may be made to the disclosed embodiments and implementations without departing from their scope. Therefore, the illustrations an examples herein should be construed in an illustrative, and not a restrictive, sense.

What is claimed is:

1. A method to provide printable content, comprising:
  maintaining at a computer system a registry of network-connected printers that are members of a social print group;
  obtaining content;
  receiving from a first printer that is a member of the group a first request to share the content with a second printer that is a member of the group;
  sending a communication that the content is accessible at the second printer;
  receiving from the second printer a second request to provide the content to the second printer;
  providing the content to the second printer.

2. The method of claim 1, wherein the communication includes a listing of the content and other printable content.

3. The method of claim 1, wherein the communication is sent to the second printer.

4. The method of claim 3, wherein the communication is viewable by a user via a user interface at the second printer.

5. The method of claim 4, wherein the communication is viewable by the user via an application executing at the second printer.

6. The method of claim 1, wherein the communication is sent to a computing device distinct from the second printer.

7. The method of claim 1, wherein the communication is viewable by the user via an application executing at a computing device distinct from the second printer.

8. The method of claim 1, wherein the communication comprises an email.

9. The method of claim 1, wherein the second request is received from a user via a user interface at the second printer.

10. The method of claim 1, wherein the second request is a request that is automatically generated at the second printer in response to the communication.

11. The method of claim 7, wherein the second request is received via an application executed at the second printer.

12. The method of claim 7, wherein the second request is received via an application executing at a computing device distinct from the second printer.

13. The method of claim 12, wherein the application comprises an internet application.

14. The method of claim 1, wherein the content is provided in a page description language format.

15. The method of claim 1, further comprising obtaining the content and converting the content into a page description language format.

16. A system to provide printable content, comprising:
 a registry module, configured to maintain at a computer system a registry of network-connected printers that are members of a social print group;
 a content obtainer module, configured to obtain content;
 a share request module, configured to receive from a first printer that is a member of the group a first request to share the content with a second printer that is a member of the group;
 a communication module, configured to send a communication that the content is accessible at the second printer;
 a provision request module, configured to receive from the second printer a second request to provide the content to the second printer;
 a provision module, configured to provide the content to the second printer.

17. The system of claim 16, wherein the communication is sent to the second printer and includes a description of the content and other content accessible at the second printer.

18. The system of claim 16, wherein the second request is received from a user via a user interface at the second printer.

19. The system of claim 16, wherein the second request is a request that is automatically generated at the second printer in response to the communication.

20. A non-transitory computer-readable storage medium containing instructions for providing printable content at a network-connected printer, the instructions when executed by a processor causing the processor to:
 maintain at a computer system a registry of internet-connected printers that are members of a social print group;
 obtain content;
 receive from a first printer that is a member of the group, via the internet, a first request to share the content with a second printer that is a member of the group;
 send to the second printer, via the internet, a communication that the content is accessible at the second printer;
 receive from the second printer, via the internet, a second request to provide the content to the second printer;
 provide the content to the second printer, via the internet, in page description language format.

* * * * *